Oct. 16, 1934.   H. W. EDEN   1,976,878
TUBE FLARING TOOL
Filed July 27, 1932   2 Sheets-Sheet 1

Inventor
Harold W. Eden
By Lloyd W. Patch
Attorney

Oct. 16, 1934.   H. W. EDEN   1,976,878
TUBE FLARING TOOL
Filed July 27, 1932   2 Sheets-Sheet 2

Inventor
Harold W. Eden
By Lloyd W. Batch
Attorney

Patented Oct 16, 1934

1,976,878

UNITED STATES PATENT OFFICE 1,976,878

TUBE FLARING TOOL

Harold W. Eden, Chicago, Ill., assignor to E. Edelmann & Co., Chicago, Ill., a corporation of Illinois Application July 27, 1932, Serial No. 625,184

8 Claims. (Cl. 153—79)

My invention relates to improvements in tube flaring tools, and particularly to a tool of this character intended and adapted for flaring the ends of copper, brass, lead, or other soft or expansible metal tubes or pipes, preparatory to making connection thereof with fittings or other parts.

An object of this invention is to provide a tool which will take and properly operate upon tubes of various diameters, and which has the parts thereof so constructed and arranged that all sizes of tubes can be operated on with equal efficiency and facility.

Another object is to so construct the parts that tubes of different sizes can be clamped and held positively in position to be operated upon without danger or possibility of denting or otherwise injuring the same, and that adjustments for the different sizes of pipes can be readily and quickly made.

With the above and other objects in view, which will be apparent to those skilled in the art, my invention includes certain novel features of construction and combinations of parts which will be hereinafter set forth in connection with the drawings.

Figure 1:
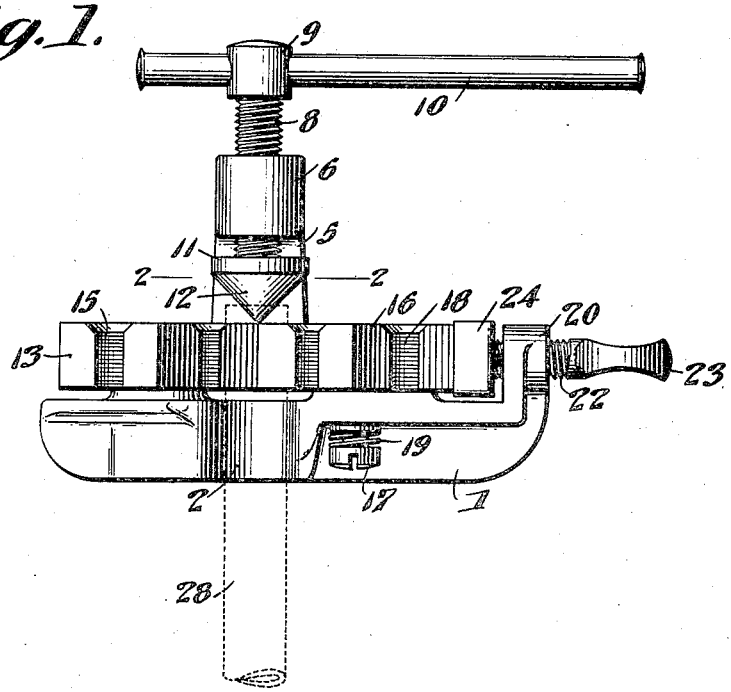
Figure 1 is a view in front elevation of a tool constructed in accordance with my invention.

The base or supporting member 1, which is of elongated form and is provided with a recess 2 in its middle portion has a bore or opening 3 on one side of this notch and a bearing slot 4 on the other side. A bracket arm 5 is extended laterally and upwardly at the closed side of the recess 2, and at the upper end of this arm an inwardly extending and overhanging portion 6 is provided. This overhanging portion 6 has an internally screw-threaded orifice 7 formed vertically therethrough substantially centered with respect to recess 2.

A screw-threaded shank 8 is turned into the orifice 7 and at its upper end has a head 9 provided with a transverse opening to receive bar 10 by which the screw 8 is turned within the threaded orifice 7. On its inner end this screw 8 has a flaring head 11, which on its lower side is of tapered conical form, as at 12, the taper being made to correspond to the desired taper in the end of the tube to be flared.

A tube holding clamp block 13 is revolubly mounted on the base or supporting member 1 by means of a screw 14, or other bearing member passing through bearing opening 13. This tube clamping block is of polygonal form, and in the present instance is shown as being hexagonal. On each side the clamp block 13 has a recess 15, the several recesses extending substantially parallel with the axis of rotation of the block and being semi-circular in cross section. These recesses are made or formed on a diameter slightly less than the outside diameter of standard sizes of tubing, and are preferably grooved transversely or otherwise treated to present roughened surface walls.

A slidable tube clamping block 16, similar to block 13, is revolubly mounted by a screw or other journal member 17 fitted revolubly and slidably through bearing slot 4, and this tube clamping block 16 has the tube clamping recess 18 formed therein in sizes corresponding to the recesses or grooves 15 of the block 13. The mounting screw 17 is of somewhat greater length than the thickness of the portion of the base or supporting member 1 through which bearing slot 4 is formed, and free sliding and turning movement are thus permitted. To insure that the block 16 will at all times be in the proper elevation with respect to block 13, a coil spring 19 is fitted to bear between the head of screw 17 and portions of the base or supporting member 1 adjacent bearing slot 4.

With the arrangement of the parts as above set forth tube clamping block 13 is free for revoluble movement to bring in one of the semi-circular tube receiving notches or recesses to a point centered below the flaring point 12, and as clamping block 16 can be slid or moved away from the block 13, this block 16 can also be readily adjusted to bring the desired recess 18 thereof into register with a corresponding recess 15 of the block 13. When the block 16 is then returned to the position with its face abutting against the face of the revoluble block 13, the recesses 15 and 18 of the abutting faces form a circular opening to receive the end of a tube and center the same immediately in line with the flaring point 12.

Figure 2:
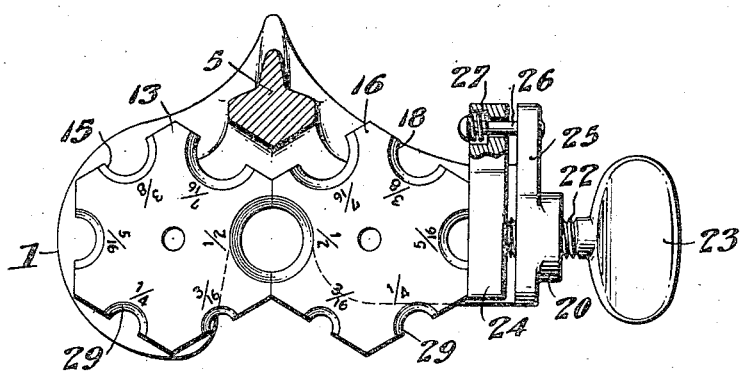
Fig. 2 is a top plan view with parts in section, substantially on line 2—2 of Fig. 1.
Figure 3:
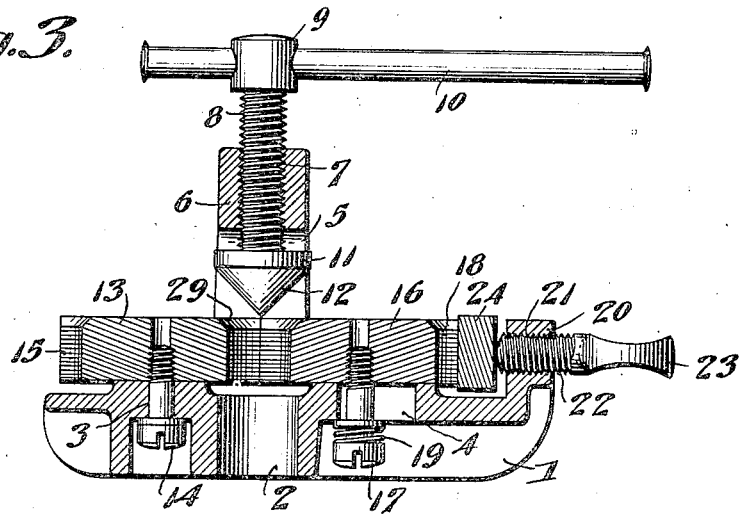
Fig. 3 is a longitudinal vertical sectional view through the structure.
Figure 4:
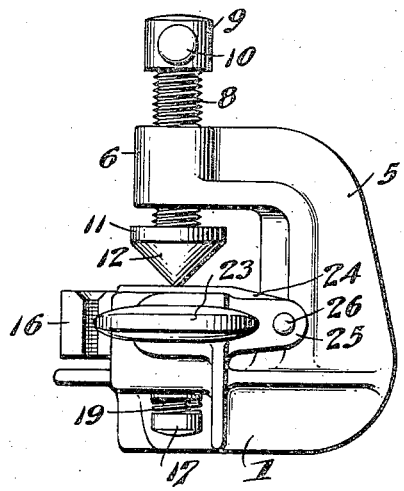
Fig. 4 is a view in end elevation.
Figure 5:
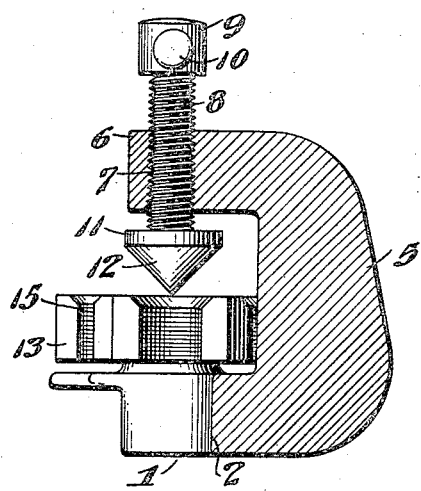
Fig. 5 is a transverse vertical sectional view.

Means to hold the slidable block 16 in the desired adjusted position and to clamp the same against the tube end is necessary, and to compensate for the sliding movement of this block 16 I provide a clamp arm 20 at the end of the supporting base member 1 beyond bearing slot 4, sufficiently spaced to permit free sliding and turning movement of this block 16. This clamping arm has an internally screw-threaded orifice 21 formed therethrough to receive clamping screw 22 provided with a wing head 23. While the clamping screw 22 might be made sufficiently long to feed over against the block 16, this would require considerable manipulation and would bring the end of the clamp screw directly into contact with the gripping face of one of the recesses 18. To overcome these objections I provide a pivoted filler block 24 mounted on a bearing ear 25 on the arm 20, and when this filler block is swung back to the opposite side from the position shown in Fig. 2, the tube clamping block 16 can be freely slid and revolved in the bearing slot 4. When proper adjustment of the parts has been made the block 16 is moved toward block 13, and the filler block 24 is then swung to the position shown in Fig. 2 where it is engaged by the clamp screw 22, as the same is turned, and in consequence the tube clamping block 16 will be moved to the proper operative position. If desired, the pin 26 on which the filler block 24 is mounted, can have a spring 27 fitted thereon to compensate for movement of the block during the clamping operation.

It is preferable that the two tube clamping blocks 13 and 16 have diameter indicating markings thereon adjacent the recesses 15 and 18 to thus insure proper setting and registry of the parts for each size of tubing.

In the use of my improved tool the handle or bar 10 is manipulated to withdraw the screw 8 sufficiently that the flaring point 12 will entirely clear and be recessed above the top faces of the blocks 13 and 16. Clamp screw 22 is released sufficiently to permit filler block 24 to be thrown back and the tube clamping block 16 can then be slid out sufficiently to permit free revoluble movement of both of the blocks 13 and 16. These blocks are then adjusted so that the proper grooves 15 and 18 for the particular size of tubing to be operated upon are presented in adjacent faces and the block 24 is returned to the position shown in Fig. 2 to retain this setting of the parts. The end of the tube, as indicated by dotted lines at 28 in Fig. 1, is then fitted upwardly through recess 2 and through the clamping jaw formed by the recesses 15 and 18, following which the clamp screw 22 is tightened to cause the piece of tubing to be securely clamped and held in place against endwise movement. As indicated in Fig. 1, the end of the tube 28 is extended above the tops of the blocks 13 and 16 a distance sufficient to make the flare, and when the screw 8 is turned through the threaded orifice 7, the flaring point 12 will be forced into this open end of the tube 28 and will cause the end of the tube to be extended and flared, in a shape corresponding to the conical end 12. It may be found desirable to countersink around the recess 15 and 18 on the upper faces of the blocks 13 and 16 as indicated at 29, to thus accommodate the form of the flare and insure a proper and uniform shape on the outside of the flared portion.

While I have herein shown and described only certain specific embodiments of my invention, it will be appreciated that changes and variations can be made in the form, construction, arrangement and assembly of the parts without departing from the spirit and scope of my invention.

I claim:

1. A flaring tool comprising a supporting member, a flaring screw carried at a fixed position upon said supporting member, a clamp block revolubly carried on said supporting member, a second clamp block revolubly and slidably carried by said supporting member, said clamp blocks being provided with cooperating tube clamping grooves to form tube receiving and clamping openings centered with respect to the flaring screw, and means to secure said clamping blocks together in tube clamping relation.

2. A tube flaring tool comprising a supporting structure having a tube receiving recess, a flaring screw movable toward and from said recess, a clamp block revolubly mounted on said supporting structure to overhang said recess and provided with tube clamping grooves in its periphery, a second tube clamping block revolubly mounted on said supporting structure and also slidably and bodily movable toward and away from said first-mentioned block, said second tube clamping block having tube clamping grooves therein to cooperate with the grooves of said first-mentioned block, and means to secure said blocks together in tube clamping relation with the tube clamping recess substantially in line with the flaring screw.

3. A tube flaring tool comprising a supporting structure having a tube receiving recess, a flaring screw movable toward and from said recess, a clamp block revolubly mounted on said supporting structure to overhang said recess and provided with tube clamping grooves in its periphery, a second tube clamping block revolubly mounted on said supporting structure and also slidably and bodily movable toward and away from said first-mentioned block, said second tube clamping block having tube clamping grooves therein to cooperate with the grooves of said first-mentioned block, and a clamp screw associated with the supporting structure to secure said blocks together in tube clamping relation with the tube clamping recess substantially in line with the flaring screw.

4. A tube flaring tool comprising a supporting structure having a tube receiving recess and provided with a bracket arm extending adjacent said recess and provided with a screw threaded orifice, a flaring screw received in said threaded orifice to work toward and away from said recess, a tube clamping block of polygonal form revolubly mounted on said supporting structure on one side of said tube receiving recess with its periphery overhanging and provided in the several faces with tube clamping grooves of various diameters substantially centered with respect to said flaring screw, a second tube clamping block of similar form revolubly and slidably mounted on said supporting structure on the opposite side of the tube receiving recess thereof, and means to move said slidably mounted clamping block toward said revolubly mounted block and secure the same in a tube clamping relation.

5. A tube flaring tool comprising a supporting structure having a tube receiving recess and provided with a bracket arm extending adjacent said recess and provided with a screw threaded orifice, a flaring screw received in said threaded orifice to work toward and away from said recess, a tube clamping block of polygonal form revolubly mounted on said supporting structure on one side of said tube receiving recess with its periphery overhanging and provided in the several faces with tube clamping grooves of various diameters substantially centered with respect to said flaring screw, a second tube clamping block of similar form revolubly and slidably mounted on said supporting structure on the opposite side of the tube receiving recess thereof, and a clamp screw associated with said supporting structure to move said slidably mounted clamping block toward the revolubly mounted block and secure the same in tube clamping relation.

6. A tube flaring tool comprising a supporting structure having a tube receiving recess and provided with a bracket arm extending adjacent said recess and provided with a screw threaded orifice, a flaring screw received in said threaded orifice to work toward and away from said recess, a tube clamping block of polygonal form revolubly mounted on said supporting structure on one side of said tube receiving recess with its periphery overhanging and provided in the several faces with tube clamping grooves of various diameters substantially centered with respect to said flaring screw, a second tube clamping block of similar form revolubly and slidably mounted on said supporting structure on the opposite side of the tube receiving recess thereof, a bracket arm associated with said supporting structure on the outer side of said slidably mounted clamp block, a clamp screw associated with said bracket arm, and a movably mounted filler block to be swung into and out of the space between said slidably mounted clamp block and the bracket carrying the clamp screw.

7. A tube flaring tool comprising a rigid support, a flaring screw carried at a fixed position on said support, a pair of clamping blocks having tube clamping grooves of various diameters therein rotatably associated to allow mating registration of corresponding grooves to form a tube clamping opening, and means to secure said clamping blocks in tube clamping relation with the mated grooves thereof in proper relation to said flaring screw.

8. A tube flaring tool comprising a rigid supporting member, a flaring screw carried at a fixed position on said supporting member, a pair of clamping blocks carried by said supporting structure each having a plurality of tube clamping grooves of various diameters and rotatably associated to allow adjustment for mating registration of corresponding grooves to form a tube receiving opening centered with respect to the flaring screw, and means to secure said clamping blocks together in tube holding relation.

HAROLD W. EDEN.